US005636830A

United States Patent [19]
Chartrand

[11] Patent Number: 5,636,830
[45] Date of Patent: Jun. 10, 1997

[54] HYDRAULIC LIFT SYSTEM

[76] Inventor: Lucien P. Chartrand, 3249 McKenzie Rd., Chelmsford, Ontario, Canada, P0M 1L0

[21] Appl. No.: 505,973

[22] Filed: Jul. 24, 1995

[51] Int. Cl.⁶ .................................................. B66F 3/24
[52] U.S. Cl. ............................................................ 254/423
[58] Field of Search ................................. 254/423, 418, 254/419, 93 R, 93 H

[56] References Cited

U.S. PATENT DOCUMENTS

| | | | |
|---|---|---|---|
| 2,442,881 | 6/1948 | Soskin | 254/423 |
| 2,472,294 | 6/1949 | Hall | 254/423 |
| 2,546,203 | 3/1951 | Tucker | 254/423 |
| 2,619,319 | 11/1952 | Lucas | 254/423 |
| 3,321,182 | 5/1967 | Elenburg | 254/423 |
| 3,362,683 | 1/1968 | Hansen | 254/423 |
| 4,165,861 | 8/1979 | Hanser | 254/423 |
| 5,232,206 | 8/1993 | Hunt et al. | 254/423 |

*Primary Examiner*—Robert C. Watson
*Attorney, Agent, or Firm*—Michael I. Kroll

[57] ABSTRACT

An improved hydraulic lift system for a motor vehicle comprising a plurality of hydraulic struts pivotally mounted to an undercarriage of the motor vehicle. An apparatus is for supplying hydraulic pressure through the system. A device is for hydraulically rotating each hydraulic strut from an up position to a down position. An assemblage is for hydraulically telescoping each hydraulic strut from a retracted position to an extended position, so as to lift the motor vehicle off of a flat support surface.

2 Claims, 4 Drawing Sheets

HYDRAULIC LIFT SYSTEM

BACKGROUND OF THE INVENTION

1. Field of the Invention

The instant invention relates generally to jacks and more specifically it relates to an improved hydraulic lift system.

2. Description of the Prior Art

Numerous jacks have been provided in prior art. For example, U.S. Pat. Nos. 3,186,686 to Mayer; 4,174,094 to Valdespino et al.; 4,445,588 to Truninger and 4,993,688 to Mueller et al. all are illustrative of such prior art. While these units may be suitable for the particular purpose to which they address, they would not be as suitable for the purposes of the present invention as heretofore described.

MAYER, PETER
HYDRAULIC JACKING SYSTEM
U.S. Pat. No. 3,186,686

A hydraulic jacking system for vehicles including a plurality of hydraulic jacks secured to the chassis of the vehicle. Each of the jacks has a ram extendable vertically downwardly from a housed position to any selected degree of extension. A similar plurality of control valves are provided. Each of the valves serve one of the jacks exclusively. Hydraulic lines interconnect each valve with its particular jack. A hydraulic fluid tank and hydraulic pump supply pressure fluid to the control valves. Each of the control valves comprise an upper valve assembly and a lower valve assembly operable simultaneously. A lever means is to operate each control valve. A pressure fluid supply means and a fluid return means are also provided. The lever means places the upper valve assembly in communication with the pressure fluid supply means and places the lower valve assembly in communication with the fluid return means in a first position. A second position of the lever means places the upper valve assembly in communication with the fluid return means and the lower valve assembly in communication with the pressure fluid supply means. In a neutral position of the lever the upper and lower valve assemblies are blanked off and fluid therewithin is trapped to provide a hydraulic lock. The pressure fluid supply means and fluid return means includes a distributor valve body. A wall divides the body into a pressure chamber and a return chamber. The pressure chamber is supplied with fluid through the pipe means from the pump and the return chamber is connected to the tank. The upper and lower valve assemblies extend across the body and passes through the wall in fluid-tight relation. Each of the valve assemblies include an outer sleeve and a piston valve slidable therein. The outer sleeve has a first orifice therethrough located within the pressure chamber and a second orifice therethrough located within the return chamber. The piston valve has a hole therethrough selectively alignable with the first or second orifice and is movable to a third position, wherein the hole is completely covered by the sleeve. Hydraulic pipes connect each of the upper valve assemblies with one side of its respective jack and connects each of the lower assemblies with the opposite side of the jack.

VALDESPINO, JOSEPH M.
BRANDI, RONALD A.
RECREATIONAL VEHICLE LEVELING AND SUPPORT SYSTEM
U.S. Pat. No. 4,174,094

A leveling and support system for recreational vehicles operates on a plurality of telescoping air cylinders. Leveling is accomplished through a separate valve in the line for each cylinder. Each valve is mounted adjacent the others, and adjacent an electrical switch which operates a DC motor in either a forward or a reverse direction. The motor actuates a rotary air compressor in a forward or reverse direction for changing the air pressure from positive to negative, while operating each of the valves to each cylinder line.

TRUNINGER, THOMAS
GUIDABLE BOGIE TRUCK FOR MOBILE CRANES
U.S. Pat. No. 4,445,588

A guidable bogie truck for a mobile crane, such as a mobile gantry cane, includes a frame having longitudinal supports. A pair of wheel mechanisms connected to one end of the frame and a pair of wheel mechanism connected to the opposite end of the frame. One of the pairs of wheel mechanisms is connected to pivotable axles, which allows the associated pair of wheel mechanism to constitute guide wheel mechanisms. Four support legs are movably connected to the frames. Lifting devices are connected to each of the four support legs to extend them downwardly to contact the ground and support the frame or to retract them upwardly towards the frame. Wheel drive motors are for turning the wheel mechanisms. Adjustment motors are for pivoting the pivotable wheel axles. A common control device is for controlling the operation of the bogie truck parts. A control panel on the bogie truck includes a shift lever and direction-setting parts which are connected to the common control device, to allow the operator to suitably determine the operation of the common control device and thus the bogie truck.

An automobile pneumatic jack system that can be easily attached to all currently manufactured automobile chassis and frames. There is a front suspension pneumatic jack that is mounted centrally to the front suspension of an automobile between its front wheels. There is also a rear suspension pneumatic jack that is mounted centrally to the rear suspension of the automobile between its rear wheels. The system operates from a compressed air reservoir tank that has connections for the front and rear car jack outlets. Additional outlets can be added to the compressed air reservoir tank, for connecting a pneumatic lug wrench and another for a tire inflating hose. A further option to the system could include a connection to the master brake cylinder such that when the car is locked, the compressed air is applied to the braking system, to lock the brakes hard on for an anti-theft feature.

SUMMARY OF THE INVENTION

A primary object of the present invention is to provide an improved hydraulic lift system that will overcome the shortcomings of the prior art devices.

Another object is to provide an improved hydraulic lift system that utilizes four hydraulic struts, in which the first pair would be mounted to the front under the carriage of a motor vehicle behind the front wheels, while the second pair would be mounted to the rear under carriage of the motor vehicle forward of the rear wheels.

An additional object is to provide an improved hydraulic lift system that can be operated by the driver from inside the motor vehicle, when the engine is turned on and the transmission is in park or neutral position.

A still additional object is to provide an improved hydraulic lift system, in which an emergency hand pump, located

3 under the hood, will operate the hydraulic struts when the engine fails to start.

A further object is to provide an improved hydraulic lift system that is simple and easy to use.

A still further object is to provide an improved hydraulic lift system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 a side perspective view of a motor vehicle with the instant invention installed and in use.

Similar reference characters denote corresponding features consistently throughout the attached drawings.

DETAILED DESCRIPTION OF THE PREFERRED EMBODIMENTS

Figure 1:
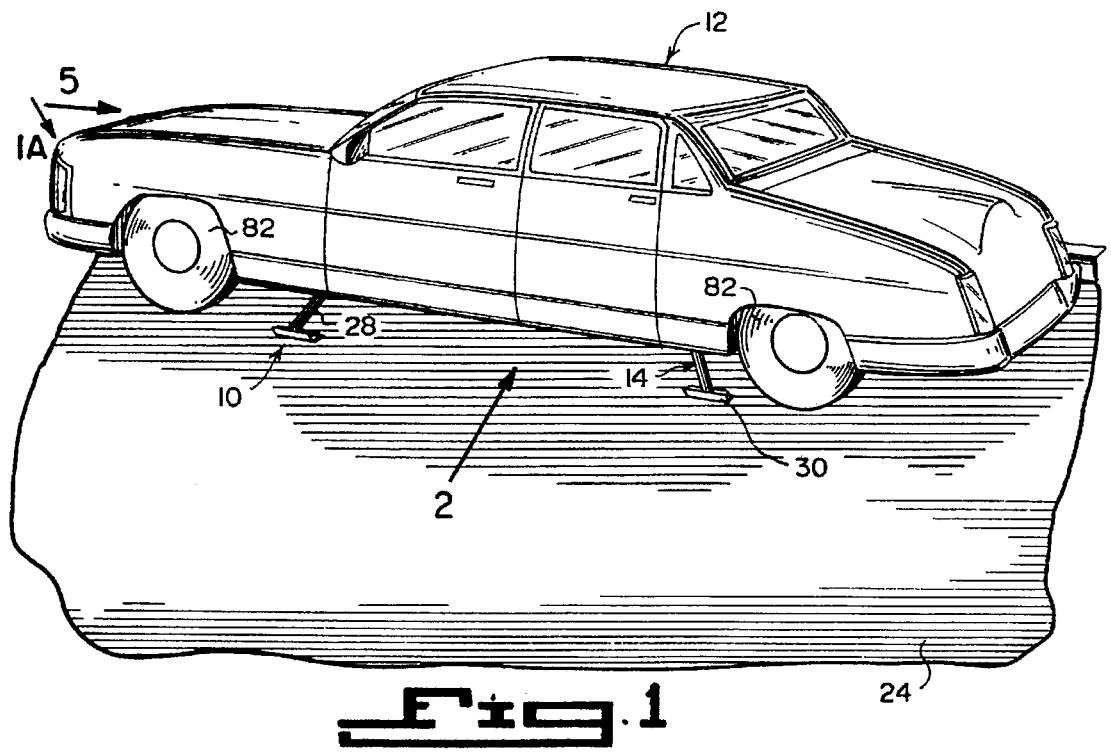
FIG. 1A is a front perspective view taken in the direction of arrow 1A in FIG. 1, with the hood open, parts of the motor vehicle broken away and the hydraulic struts retracted.

Turning now descriptively to the drawings, in which similar reference characters denote similar elements throughout the several views, FIGS. 1 through 5 illustrate an improved hydraulic lift system 10 for a motor vehicle 12, comprising a plurality of hydraulic struts 14 pivotally mounted to an undercarriage 16 of the motor vehicle 12. An apparatus 18 is for supplying hydraulic pressure through the system 10. A device 20 is for hydraulically rotating each hydraulic strut 14 from an up position to a down position. An assemblage 22 is for hydraulically telescoping each hydraulic strut 14 from a retracted position to an extended position, so as to lift the motor vehicle 12 off of a flat support surface 24.

Each hydraulic strut 14 includes an outer cylinder 26. A piston rod 28 slides within the outer cylinder 26. A foot pad

4

30 is pivotally mounted at 32 to a lower end of the piston rod 28. The foot pad 30 will engage with the flat support surface 24 when in the down position.

The hydraulic pressure supplying apparatus 18 consists of a hydraulic pump 34. A facility 36 is for mechanically operating the hydraulic pump 34 from an engine 38 of the motor vehicle 12. The mechanically operating facility 36 is a belt and pulley assembly 40 extending between the hydraulic pump 34 and the engine 38 of the motor vehicle 12.

The hydraulic pressure supplying apparatus 18 further includes a split valve 42. A unit 44 is for fluidly connecting the split valve 42 to the hydraulic pump 34. The first fluidly connecting unit 44 includes first and second hydraulic hose lines 46, 48 extending between the hydraulic pump 34 and the split valve 42.

Each hydraulic rotating device 20 consists of a rotary actuator 50 rotatively connected to a top end 52 of the outer cylinder 26. A reversing valve 54 is electrically connected to and operated by a remote switch (not shown). A unit 56 is for fluidly connecting the reversing valve 54 to the rotary actuator 50. Another unit 58 is for fluidly connecting the reversing valve 54 to the split valve 42.

The second fluidly connecting unit 56 includes a third hydraulic hose line 60, extending between one side of the reversing valve 54 and the rotary actuator 50. A fourth hydraulic hose line 62 extends between an opposite side of the reversing valve 54 and the rotary actuator 50. The third fluidly connecting unit 58 is a fifth hydraulic hose line 64, extending between the split valve 42 and the reversing valve 54.

The hydraulic telescoping assemblage 22 comprises a unit 66 for fluidly connecting the split valve 42 to upper and lower portions of the outer cylinder 26 of the hydraulic strut 14. A control lever 68 is provided. A unit 70 is for fluidly connecting the control lever 68 to the split valve 42.

The fourth fluidly connecting unit 66 includes a sixth and seventh hydraulic hose lines 72, 74, extending concentrically between the split valve 42 and the upper and lower portions of the outer cylinder 26 of the hydraulic strut 14. The fifth fluidly connecting unit 70 is an eighth hydraulic hose line 76, extending between the split valve 42 and the control lever 68.

Figure 2:
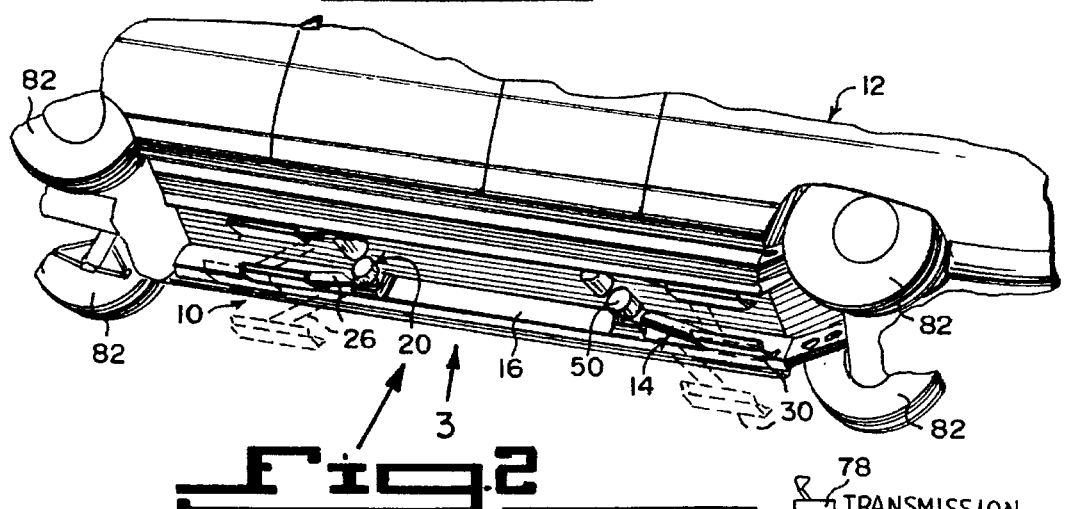
FIG. 2 is a bottom perspective view taken in the direction of arrow 2 in FIG. 1, with parts of the motor vehicle broken away and the hydraulic struts retracted.
Figure 2A:
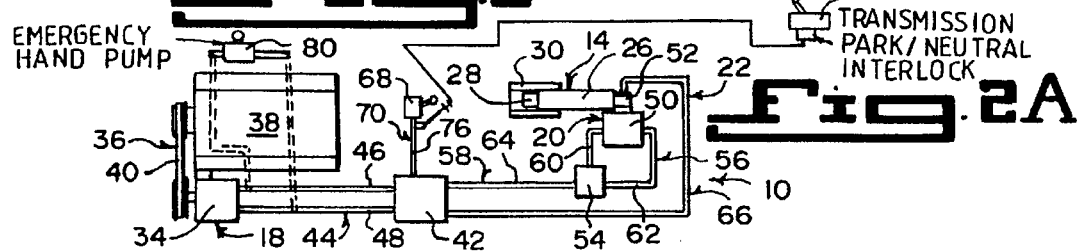
FIG. 2A is a diagrammatic side view, showing the various components for operating the front right hydraulic strut.

A transmission park/neutral interlock 78, as shown in FIG. 2A, is coupled to the eight hydraulic hose line 76, so as to make it impossible to operate the control lever 68 and prevent accidental application while the motor vehicle 12 is in motion.

Figure 1A:
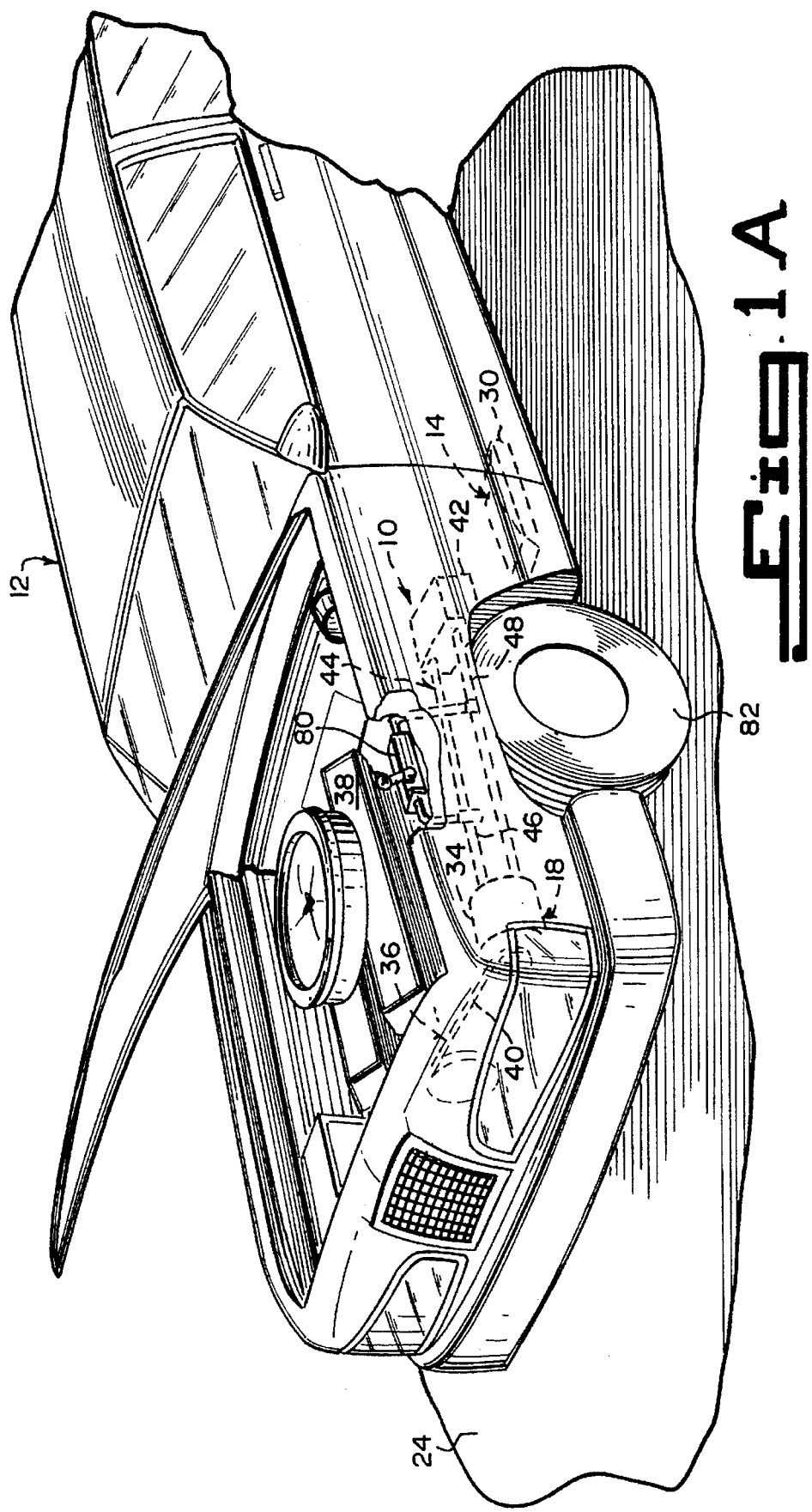
Figure 2B:
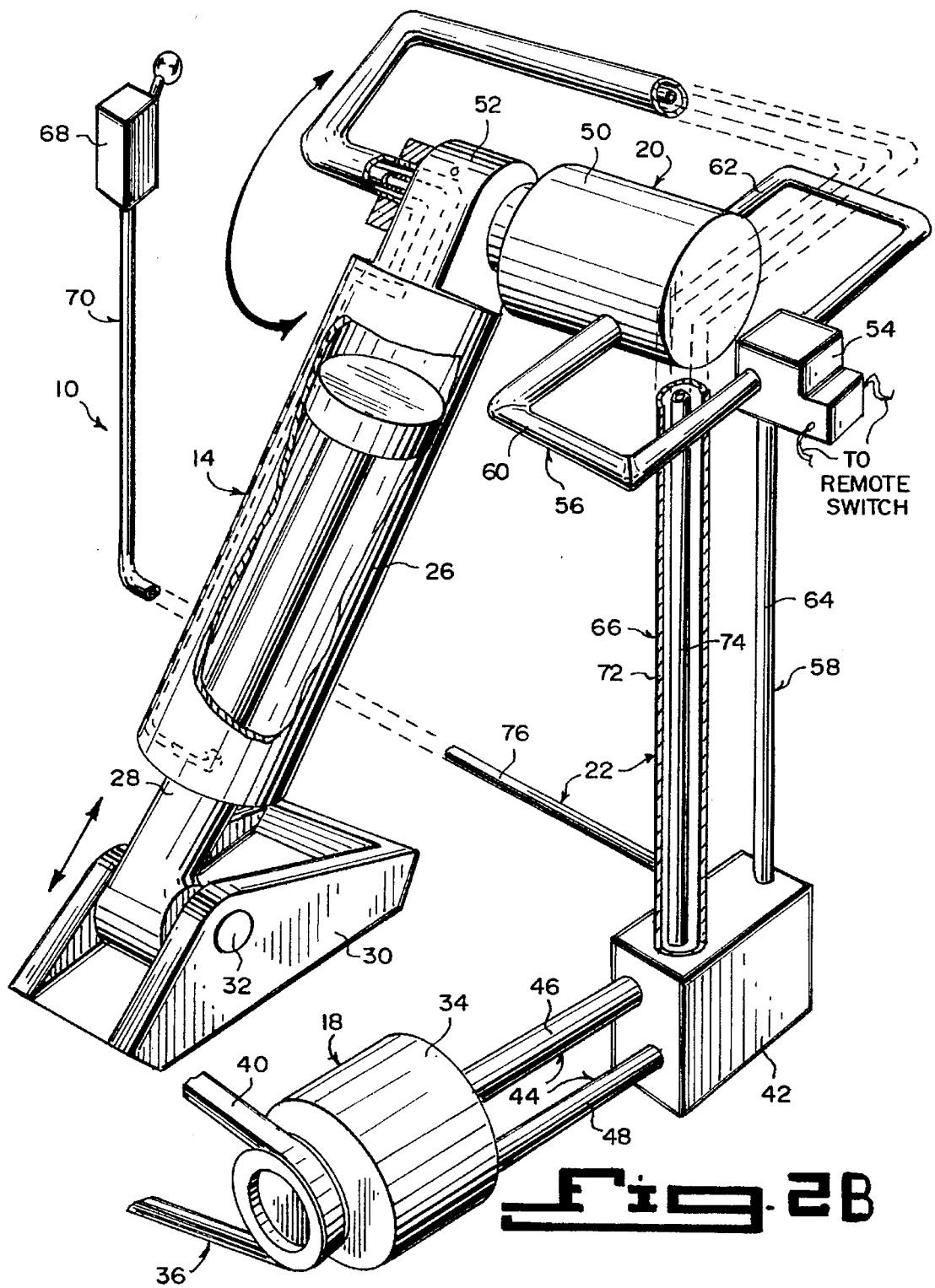
FIG. 2B is a perspective view with parts broken away and in section of some of the various components in FIG. 2A, for operating the front right hydraulic strut.
Figure 3:
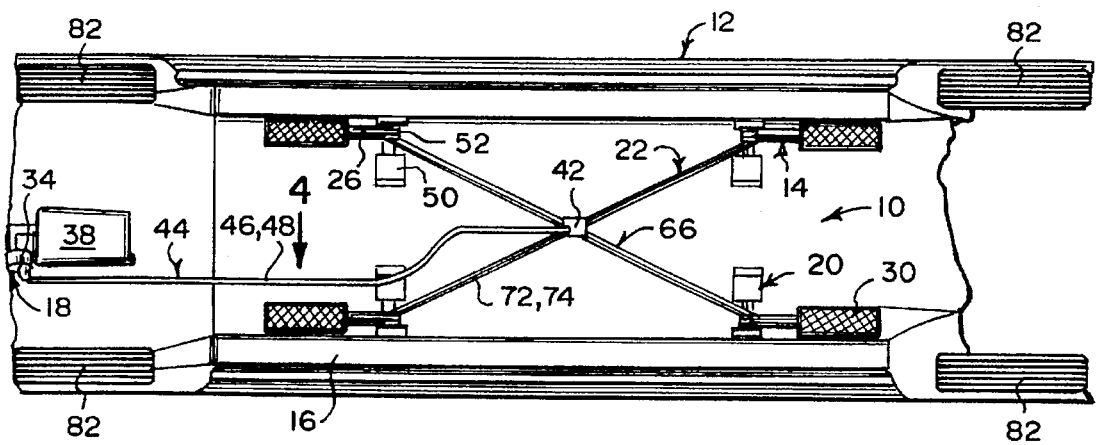
FIG. 3 is a diagrammatic bottom view as indicated by arrow 3 in FIG. 2.
Figure 4:
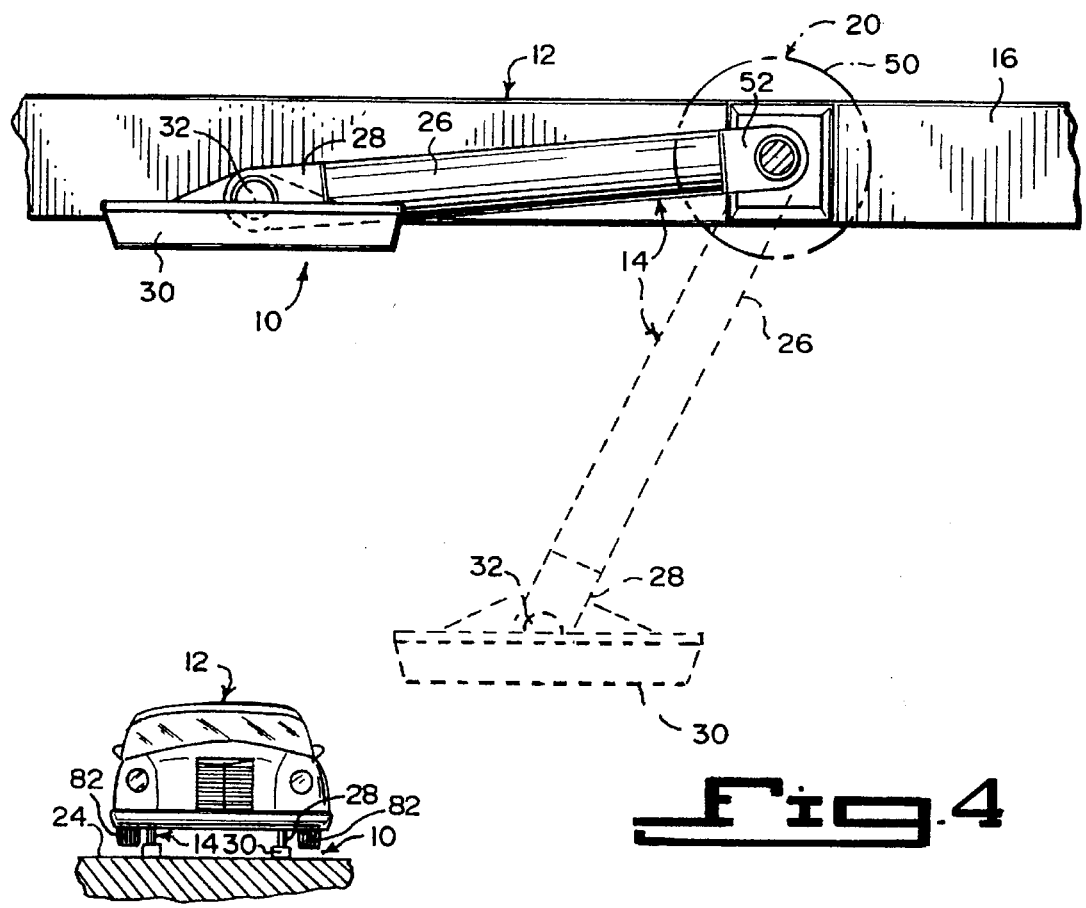
FIG. 4 is an enlarged side view taken in the direction of arrow 4 in FIG. 3, with parts broken away in phantom and in a dotted moved position, showing the front left hydraulic strut in greater detail.
Figure 5:
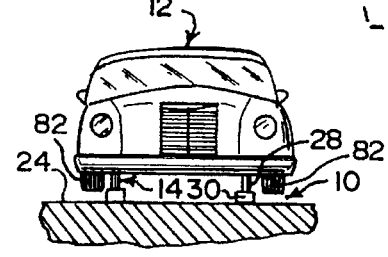
FIG. 5 is a front view taken in the direction of arrow 5 in FIG. 1.

An emergency hand pump 80, as shown in FIG. 1A and 2A, can be fluidly connected into the first and second hydraulic hose lines 44 and 46 between the hydraulic pump 34 and the split valve 42. The emergency hand pump 80 will operate the hydraulic struts 14 when the engine 38 fails to start.

OPERATION OF THE INVENTION

To use the improved hydraulic lift system 10 to raise the motor vehicle 12, the following steps should be taken:

1. Engage the transmission park/neutral interlock 78.
2. Keep the engine 38 of the motor vehicle 12 running to operate the hydraulic pump 34 of the hydraulic pressure supplying apparatus 18.
3. Turn the remote switch on a dashboard within the motor vehicle 12 one way, to cause the rotary actuators 50 of the hydraulic rotating device 20 to lower the hydraulic struts 14 to the down position.

4. Operate the control lever 68 to make the piston rods 28 in the outer cylinders 26 of the hydraulic struts 14 to go into the extended position, until the foot pads 30 contact the flat support surface 24 to lift the wheels 82 of the motor vehicle 12 off of the flat support surface 24.

To use the improved hydraulic lift system 10 to lower the motor vehicle 12, the following steps should be taken:

1. Operate the control lever 68 to now make the piston rods 28 in the outer cylinder 26 of the hydraulic struts 14 to go into the retracted position, so that the foot pads 30 move away from the support surface 24 to lower the wheels 82 of the motor vehicle 12 back onto the flat support surface 24.
2. Turn the remote switch on the dashboard within the motor vehicle 12 an opposite way, to cause the rotating actuators 50 of the hydraulic rotating device 20 to raise the hydraulic struts 14 to the up position.
3. Shut down the engine 38 of the motor vehicle 12 to stop the hydraulic pump 34 of the hydraulic pressure supplying apparatus 18 from operating.
4. Disengage the transmission park/neutral interlock 78.

LIST OF REFERENCE NUMBERS

- 10 improved hydraulic lift system
- 12 motor vehicle
- 14 hydraulic strut of 10
- 16 undercarriage of 12
- 18 hydraulic pressure supplying apparatus of 10
- 20 hydraulic rotating device of 10
- 22 hydraulic telescoping assemblage of 10
- 24 flat support surface
- 26 outer cylinder of 14
- 28 piston rod of 14
- 30 foot pad of 14
- 32 pivot mount between 28 and 30
- 34 hydraulic pump of 18
- 36 mechanically operating facility of 18
- 38 engine of 12
- 40 belt and pulley assembly for 36
- 42 split valve of 18
- 44 first fluidly connecting unit of 18
- 46 first hydraulic hose line of 44
- 48 second hydraulic hose line of 44
- 50 rotary actuator of 20
- 52 top end of 26
- 54 reversing valve of 20
- 56 second fluidly connecting unit of 20
- 58 third fluidly connecting unit of 20
- 60 third hydraulic hose line of 56
- 62 fourth hydraulic hose line of 56
- 64 fifth hydraulic hose line of 58
- 66 fourth fluidly connecting unit of 22
- 68 control lever of 22
- 70 fifth fluidly connecting unit of 22
- 72 sixth hydraulic hose line of 66
- 74 seventh hydraulic hose line of 66
- 76 eighth hydraulic hose line of 70
- 78 transmission park/neutral interlock
- 80 emergency hand pump
- 82 wheel of 12

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved hydraulic lift system for a motor vehicle comprising:

A) a plurality of hydraulic struts pivotally mounted to an undercarriage of the motor vehicle, each of said struts including:
      i) an outer cylinder;
      ii) a piston rod that slides within said outer cylinder; and
      iii) a foot pad pivotally mounted to a lower end of said piston rod, whereby said foot pad will engage with the flat support surface when in the down position;

B) means for supplying hydraulic pressure through said system, said hydraulic pressure supplying means including:
      i) a hydraulic pump;
      ii) means for mechanically operating said hydraulic pump from the engine of the motor vehicle, said mechanically operating means comprising a belt and pulley assembly extending between said hydraulic pump and the engine of the motor vehicle;
      iii) a split valve; and
      iv) means for fluidly connecting said split valve to said hydraulic pump, said fluidly connecting means including first and second hydraulic hose lines extending between said hydraulic pump and said split valve;

C) means for hydraulically rotating each said hydraulic strut from an up position to a down position, each said hydraulic rotating means including:
      i) a rotary actuator rotatively connected to a top end of said outer cylinder;
      ii) a reversing valve electrically connected to and operated by a remote switch;
      iii) means for fluidly connecting said reversing valve to said rotary actuator, said fluidly connecting means including:
         a) a third hydraulic hose line extending between one side of said reversing valve and said rotary actuator; and
         b) a fourth hydraulic hose line extending between an opposite side of said reversing valve and said rotary actuator; and
      iv) means for fluidly connecting said reversing valve to said split valve, said fluidly connecting means including a fifth hydraulic hose line extending between said split valve and said reversing valve;

D) means for hydraulically telescoping each said hydraulic strut from a retracted position to an extended position, so as to lift the motor vehicle off of a flat support surface, said hydraulic telescoping means including:

i) means for fluidly connecting said split valve to upper and lower portions of said outer cylinder of said hydraulic strut, said fluidly connecting means including sixth and seventh hydraulic hose lines extending concentrically between said split valve and the upper and lower portions of said outer cylinder of said hydraulic strut;

ii) a control lever; and iii) means for fluidly connecting said control lever to said split valve, said fluidly connecting means comprising and eighth hydraulic hose line extending between said split valve and said control lever; and E) a transmission park/neutral interlock coupled to said eighth hydraulic hose line, so as to make it impossible to operate said control lever and prevent accidental application while the motor vehicle is in motion.

2. An improved hydraulic lift system as recited in claim 1, further including an emergency hand pump fluidly connected into said first and second hydraulic hose lines between said hydraulic pump and said split valve, so that said emergency hand pump will operate said hydraulic struts when the engine fails to start.

* * * * *